US010098193B2

(12) United States Patent
Hue et al.

(10) Patent No.: US 10,098,193 B2
(45) Date of Patent: Oct. 9, 2018

(54) METHOD AND CONTROL MODULE FOR PULSED LUMINOUS FLUX LIGHT SOURCES FOR A MOTOR VEHICLE

(71) Applicant: VALEO VISION, Bobigny (FR)

(72) Inventors: David Hue, Bobigny (FR); Laurent Jean Francois, Bobigny (FR); Mourad Sakly, Bobigny (FR)

(73) Assignee: VALEO VISION, Bobigny (FR)

( * ) Notice: Subject to any disclaimer, the term of this patent is extended or adjusted under 35 U.S.C. 154(b) by 0 days.

(21) Appl. No.: 15/903,601

(22) Filed: Feb. 23, 2018

(65) Prior Publication Data

US 2018/0242413 A1    Aug. 23, 2018

(30) Foreign Application Priority Data

Feb. 23, 2017  (FR) ...................... 17 51408

(51) Int. Cl.
*B60Q 1/26* (2006.01)
*H05B 33/08* (2006.01)

(52) U.S. Cl.
CPC ..... *H05B 33/0815* (2013.01); *H05B 33/0845* (2013.01)

(58) Field of Classification Search
CPC ..... F21V 23/02; F21V 25/12; H05B 37/0236; A63J 17/00; F21L 14/026; B60Q 3/0293; B60Q 11/005; B60Q 1/387; B60Q 1/2603; B60Q 3/048; B60Q 1/44; B60Q 1/143; B60Q 1/1423; B60Q 9/001; B60Q 2300/112; B60Q 1/1415; B60Q 1/54; B60R 16/03; H02K 21/48; B62J 6/001; B62J 6/003; H02J 7/1492
See application file for complete search history.

(56) References Cited

U.S. PATENT DOCUMENTS

| | | | |
|---|---|---|---|
| 2009/0212706 A1* | 8/2009 | Noyori | H05B 37/00 |
| 2012/0038288 A1 | 2/2012 | Bai et al. | |
| 2015/0223299 A1 | 8/2015 | Stockstad et al. | |
| 2016/0207452 A1 | 7/2016 | Hue et al. | |
| 2016/0347236 A1* | 12/2016 | Yatsuda et al. | B60Q 1/085 |

FOREIGN PATENT DOCUMENTS

| | | |
|---|---|---|
| AT | 517324 A1 | 12/2016 |
| EP | 2 418 918 A1 | 2/2012 |
| FR | 3 010 937 A1 | 3/2015 |

OTHER PUBLICATIONS

French Preliminary Search Report dated Sep. 25, 2017 in French Application 17 51408 filed on Feb. 23, 2017 (with English Translation of Categories of Cited Documents).

* cited by examiner

*Primary Examiner* — Minh D A
(74) *Attorney, Agent, or Firm* — Oblon, McClelland, Maier & Neustadt, L.L.P.

(57) ABSTRACT

A method and a control module which are appropriate for the control of the supply of electric current to light sources with electroluminescent semiconductor elements. According to the invention, the supply current is pulsed at a predetermined frequency, and is compliant with predetermined setpoints for the luminous flux or electric current.

20 Claims, 3 Drawing Sheets

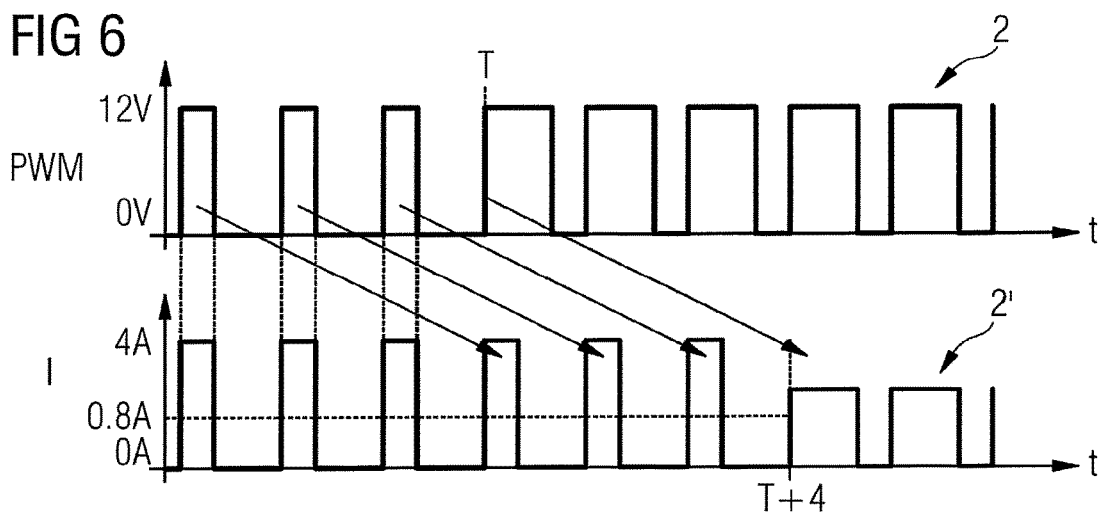
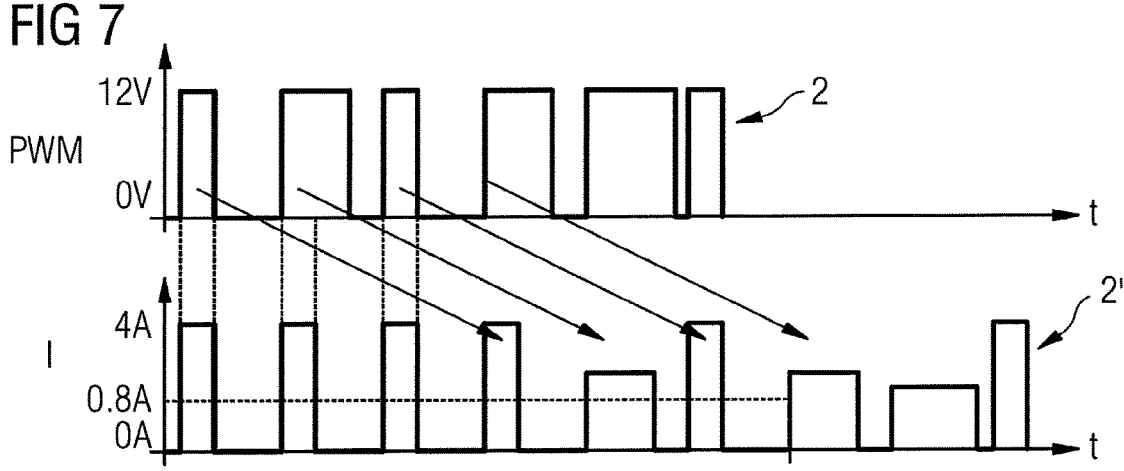
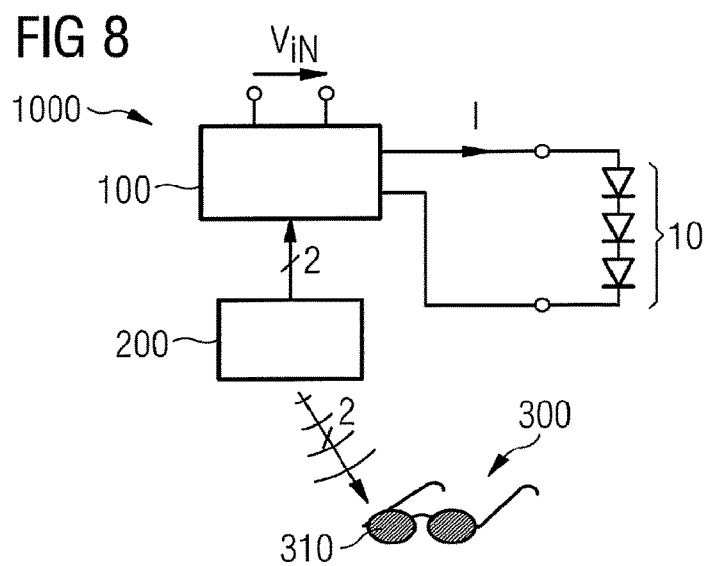

METHOD AND CONTROL MODULE FOR PULSED LUMINOUS FLUX LIGHT SOURCES FOR A MOTOR VEHICLE

The invention relates to lighting systems for motor vehicles. Specifically, it relates to methods and control modules for light sources having a pulsed electric power source.

The employment of light sources with a semiconductor element, such as light-emitting diodes or LEDs, is increasingly common for the execution of various lighting functions on a motor vehicle. These functions can include, for example, running lights, position lights, directional indicators or dipped-beam headlamps. In a known manner, an electric power supply control device is necessary for the supply of a group of LEDs which execute a given lighting function. A control device of this type generally comprises a voltage converter which, from a DC input voltage supplied by an on-board source in the vehicle, such as a battery, is capable of generating an output voltage of an appropriate rating for the supply of the group of LEDs. A LED emits light when a voltage which is at least equal to a threshold value, described as the direct voltage, is applied to its terminals. The intensity of the luminous flux emitted by an LED generally increases proportionally to the average intensity of the electric current flowing therein, beyond the threshold value of the direct current. However, when a current in excess of a given threshold value flows in the LED, the semi-conductive junction of the latter is exposed to a risk of severe and permanent damage.

Known converters include converters of the SEPIC type (from the English: "Single-Ended Primary Inductor Converter"), flyback type, voltage step-up type ("boost") or voltage step-down type ("buck"). Such converters employ a switching element, such as a transistor, which is periodically switched between open and closed states. The cut-off frequency applied to the switch influences the value of the output voltage and the average value of the output current.

It is also known for the luminous intensity of light sources thus powered to be regulated by the application of a PWM signal (for "pulse width modulation") with a known duty cycle and peak current to the switching converter. The frequency of the pulse width modulation signal has an impact upon the duty cycle. By adjusting the frequency of the pulse width modulation signal, an average predetermined current intensity can be achieved in the converter. In the light sources thus supplied, this means that a luminous flux of an intensity corresponding to the average intensity of the current flowing therein is emitted. The greater the average intensity of the current flowing in the light sources, the greater the intensity of the luminous flux emitted by said light sources. As the frequency of a PWM signal is generally high, the luminous flux emitted will be pulsed at the same frequency, and the pulsations will not be perceptible to the human eye. The visual system in human beings is characterized by an integral type of perception wherein, in relation to a constant and non-pulsed luminous flux, a flux of constant, but reduced, luminous intensity is perceived.

In the context of systems involving road safety, the use of a motor vehicle headlight with a pulsed luminous flux has been proposed, wherein the flux is controlled by a signal of the PWM type. The driver of the vehicle wears spectacles incorporating shutters, which are also controlled by the same PWM signal, in a synchronous manner to the headlight. At the frequency of the PWM signal, the spectacles switch from a transparent state to an opaque state, or to a state of reduced transparency. As the frequency of obturation is synchronized with the pulsation frequency of the luminous flux emitted by the headlight on the vehicle of the driver, the spectacles have no effect upon the perception of the flux emitted by the headlight. The driver perceives the road ahead to be perfectly illuminated by the pulsed headlight. However, luminous fluxes emitted by road traffic approaching in the opposite direction are not synchronized with the frequency of obturation of the spectacles worn by the driver, with a probability close to 1. The shutters of the spectacles are therefore opaque to at least a proportion of the luminous fluxes directed towards the eye of the driver. Spectacles having pulsed shutters thus reduce the perception of luminous intensity from the headlights of other motor vehicles, thereby reducing the risk of dazzling the driver, and improving safety in general.

In an application of this type, the peak current used to supply the LEDs of the headlight is high by definition, in order to ensure the delivery of a luminous flux of high intensity. By definition, the flux must be pulsed in all cases. In the event of a short-circuit or a variation in the duty cycle of the PWM control signal, the peak current may therefore be supplied to the LEDs for a prolonged time period, thereby resulting in damage to the LEDs.

The object of the invention is to rectify at least one of the problems posed by the prior art. More specifically, the object of the invention is the proposal of a method and a module for the control of light sources on a motor vehicle which reduce the risk of damage to light sources associated with the presence of spurious variations in the control signal of the device for the control of the electric power supply to said light sources.

The object of the invention is a control method for at least one light source on a motor vehicle. The method is distinguished in that it comprises the following steps:

a) the provision of a setpoint for the luminous flux to be emitted by the light source(s), in a control unit of a control module for said light source(s);

b) reception, in the control unit, of a first control signal, wherein said first signal is intended to control a device for the control of the electric power supply to the light source(s);

c) verification, in the control unit, of the capability of the first control signal to control the control device, such that the luminous flux setpoint is observed;

d) if the control signal does not show this capability, generation, in the control unit, of a second control signal, wherein said second signal is intended to control the device for the control of the electric power supply, in place of said first signal.

According to an advantageous form of the invention, the first control signal is periodic at a first frequency and/or the second control signal is periodic at a second frequency. The second frequency is advantageously equal to the first frequency. Alternatively, the first and/or the second control signal may be non-periodic.

Advantageously, the first control signal and/or the second control signal shows a square-wave form.

The luminous flux setpoint can be replaced or supplemented by an electric current setpoint, indicating an average current intensity value.

The luminous flux setpoint can preferably comprise a luminous intensity setpoint.

The method can preferably comprise the following step:

e) if the first control signal shows the desired capability, said first signal is employed to control the device for the control of the electric power supply.

The rising edges of the second control signal can preferably be synchronized in time with the rising edges of the first control signal. By the term "synchronized", it is understood that the rising edges of the first and second signals are perfectly synchronized, or are configured with a constant mutual offset.

In step c), a constant current setpoint can preferably be established by the central unit, by determining the average electric current intensity required to achieve the luminous flux setpoint; the first control signal can preferably be appropriate for the achievement of the setpoint, if its duty cycle and the peak current which would be generated by the control device upon the execution of control by means of said first signal will permit the delivery of an average current intensity which is equal to said current setpoint.

In a preferred manner, the second control signal can show a duty cycle which is different from that of the first control signal.

Preferably, the control device controlled by the second control signal can generate a peak current which differs from the peak current which would be generated in response to control by the first control signal.

Steps a) and d) of the method can preferably be temporally offset by at least one period of the two signals.

Preferably, the first frequency can be a predetermined frequency.

Alternatively, the first frequency can be determined by the central unit.

A further object of the invention is a module for the control of at least one light source on a motor vehicle. The module comprises a device for the control of the electric power supply to the light source(s), and a control unit. The module is distinguished in that the control unit comprises:
  means for the reception of a first control signal,
  a memory component for the storage of a setpoint for the luminous flux to be emitted by the light source(s), or of a current setpoint;
  means for the processing of data, which are configured to verify the capability of the first control signal for the control of the control device, such that the luminous flux setpoint is observed;
  generation means which are configured to generate, if the first control signal does not show this capability, a second control signal, wherein said second signal is intended to control the device for the control of the electric power supply, in place of said first signal.

Means for the processing of data in the central unit can preferably be configured for the deployment of the method according to the invention.

Preferably, the processing means can comprise a microcontroller element.

Finally, a further object of the invention is a lighting system for a motor vehicle. The lighting system is distinguished in that it comprises
  at least one light source;
  a screen incorporating means for the reception of a control signal, and optical obturation means which are controlled by a control signal thus received;
  a device for the generation of a first control signal, and
  a control module according to the invention.

The generation device is configured to transmit the first control signal in a synchronized manner to the screen via a first data transmission channel, and to the control module via a second data transmission channel.

The screen can be fitted to a pair of spectacles, a windscreen, a sun shield and/or a visor of a helmet.

The first data transmission channel can preferably be a wireless channel.

In a preferred manner, the second data transmission channel can be a wired channel.

The light source(s) can preferably comprise sources with an electroluminescent semiconductor element. These include, for example, light-emitting diodes (LEDs) or laser diodes.

By the application of measures according to the invention, it is possible to propose a method and a module for the control of light sources, for example of the LED type, which is robust in response to spurious variations in the control signal of the device for the control of the electric power supply to the LEDs. The use of a control module, which acts as an intelligent filter, permits the detection of control signals which would generate a supply current of excessive intensity in the LEDs, wherein this intensity would result in damage to the LEDs. The control module modifies or corrects such a control signal in order to protect the LEDs. At the same time, the modified or replacement control signal has the same frequency as the original control signal, and is preferably synchronized with the latter. This configuration renders the solution particularly appropriate for application in a lighting system, in which the original signal is also used to control the shutter spectacles. In practice, such a system can only function correctly if the respective control signals of the shutters (i.e. the original signal) and of the light sources (i.e. the signal modified by the control module) have equal frequencies.

Further characteristics and advantages of the present invention will be clarified by reference to the exemplary description and the drawings, wherein:

FIG. 6 shows the characteristic of a control signal and of the electric current intensity delivered to a light source of the LED type, in an architecture employing a method and a control module according to a preferred form of embodiment of the invention;

FIG. 7 shows the characteristic of a control signal and of the electric current intensity delivered to a light source of the LED type, in an architecture employing a method and a control module according to a preferred form of embodiment of the invention;

FIG. 8 shows a schematic illustration of a lighting system for a motor vehicle according to a preferred form of embodiment of the invention.

Unless specifically indicated to the contrary, technical characteristics described in detail for a given form of embodiment can be combined with technical characteristics described in the context of other forms of embodiment, which are described in an exemplary and non-limiting manner.

Figure 1:
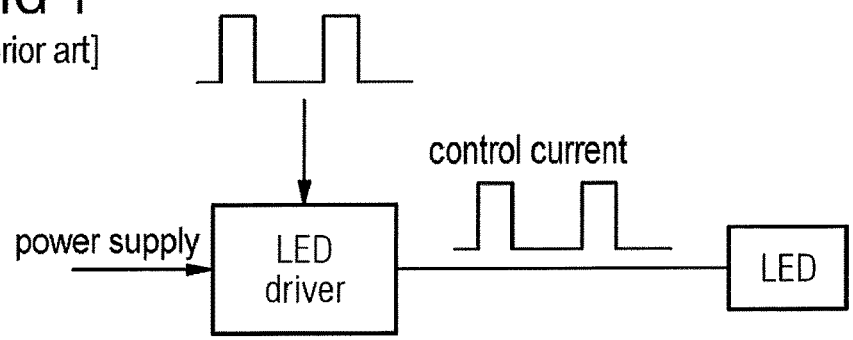
FIG. 1 shows a schematic representation of a power supply architecture for a light source of the LED type, which is known from the prior art.
Figure 2:
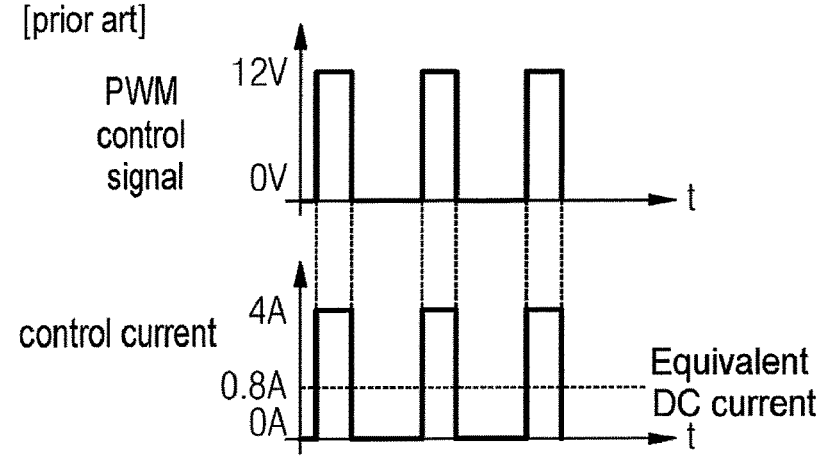
FIG. 2 shows the characteristic of a control signal and of the electric current intensity delivered to a light source of the LED type, in a known architecture from the prior art, as illustrated in FIG. 1.
Figure 3:
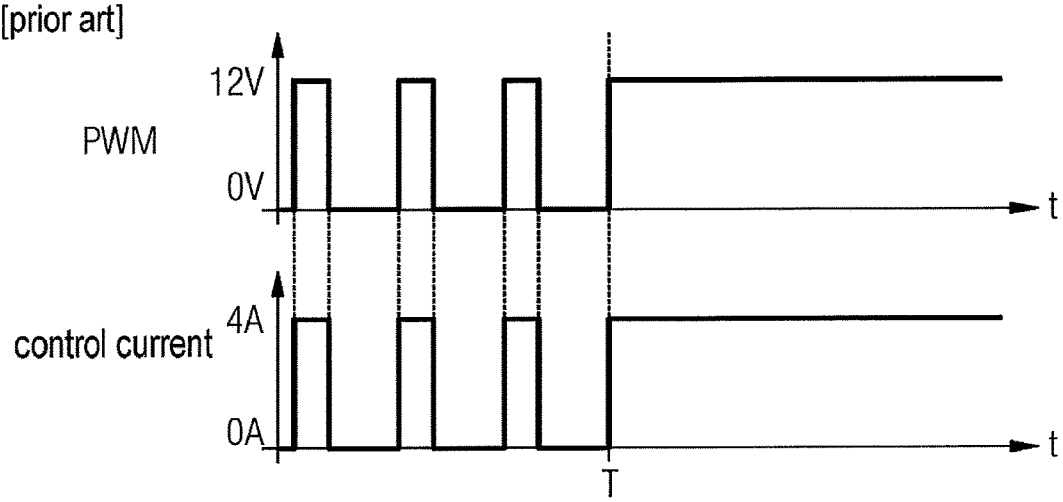
FIG. 3 shows the characteristic of a control signal and of the electric current intensity delivered to a light source of the LED type, in an architecture known from the prior art, as illustrated in FIG. 1.

FIG. 1 illustrates a known architecture for the control of the electric power supply of one or more light-emitting diodes, or LEDs. An electric power supply control device is indicated by the "LED driver" unit. This device is designed to convert a DC input voltage $V_{IN}$, generally supplied by an on-board source on the motor vehicle which is equipped with said device, into a load voltage which is appropriate for the supply of the LEDs. The operation of such an electric power supply control device will not be described in detail in the context of the present invention, as it is known per se from the prior art. The device thus incorporates at least one conversion circuit of the voltage step-down type ("buck"), the voltage step-up type ("boost") or the SEPIC type ("Single-Ended Primary Inductance Converter"). Moreover, the average intensity of the load current can be influenced in a known manner by a PWM ("Pulse Width Modulation") signal. The average intensity of the load current has a direct impact upon the luminous intensity emitted by the LEDs thus supplied. The luminous intensity emitted increases with the average current intensity. The configuration of the control device is generally such that the movement in the electric current which supplies the LEDs closely follows the movement in the PWM control signal. This is represented in an exemplary manner in FIG. 2, with reference to the known architecture from FIG. 1. The electric current supplied to the LEDs follows the periodic and square-wave characteristic of the PWM control signal, resulting in an electric current of average intensity equivalent to 0.8 A. In the example illustrated, this average current permits the illumination of LEDs with no risk of damage to the semi-conductive junction thereof. The peak current is 4 A. FIG. 3 illustrates a similar case, with reference to the known architecture from FIG. 1. However, at a time T, the PWM signal is short-circuited, resulting in a duty cycle of 100%. As the current delivered to the LEDs follows the PWM signal, a constant current of an intensity equal to the peak current is delivered in a continuous manner with effect from time T. However, this current of 4 A irreversibly damages the semi-conductive junctions of the LEDs.

Figure 4:
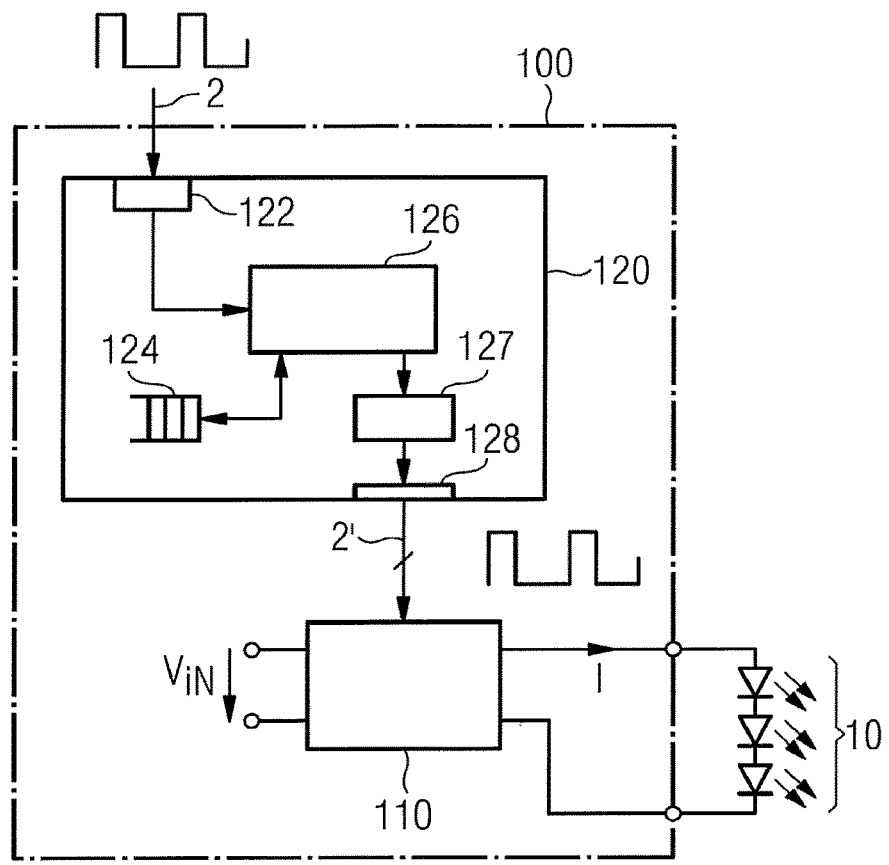
FIG. 4 shows a schematic illustration of a control module according to a preferred form of embodiment of the invention.

FIG. 4 shows a schematic illustration of a control module 100 according to a preferred form of embodiment of the invention. At its input, the module receives a periodic square-wave control signal 2, having a first frequency. This is, for example, a pulse width modulation or PWM signal, characterized by a peak value and a duty cycle which determine an average value for a given period. At its output, the module delivers an electric current of intensity I to an assembly of light sources 10 on a motor vehicle. In the example illustrated, these are light-emitting diodes arranged in series. The signal 2 is received by reception means 122 of a control unit 120 of the module. The module also comprises a memory element 124 in which a setpoint for the flux to be emitted by the LEDs 10 or, in an equivalent manner, a setpoint for the average intensity of electric current to be delivered to the LEDs 10, is stored. The setpoint can, for example, be dependent upon the lighting function which is to be executed within a motor vehicle. Data processing means 126 embodied, for example, as a microprocessor or a programmable unit, are configured for the comparison of the properties of the control signal 2 in relation to the predetermined setpoint. The data processing means can moreover be configured to determine the frequency and the duty cycle of the signal 2, by means of signal processing tools which are known per se from the prior art. Alternatively, these data can be pre-recorded in the memory element of the control unit 120. Once the frequency, the duty cycle and peak value of the signal 2 are known, the processing unit calculates the average current intensity I which would be delivered by the device 110 for the control of the power supply to the LEDs 10, if the control device 110 were to be controlled directly by the PWM signal 2, in an analogous manner to the known case from FIG. 1. According to the methods of calculation, the processing means 126 employ one period or multiple periods of the signal 2 to determine the necessary calculation variables. If the resulting value of electric current intensity is appropriate for the fulfilment of the predetermined setpoint, the signal 2 is employed, with no modifications, to control the control device 110.

In the event that the signal 2 induces a current I which is not compliant with the predetermined setpoint, and is liable to damage the LEDs 10, the processing means 126, by the employment of the generation means 127, will generate a new control signal 2', which represents a modified version of the original control signal 2. The second control signal 2' is advantageously periodic and of a square-wave form, and advantageously has a frequency which is identical to the frequency of the original control signal 2. However, the duty cycle and/or peak value is modified such that the intensity of the electric current I delivered by the control device 110 to the LEDs 10, further to the application of the control signal 2', is compliant with the predetermined setpoint. By operating in this manner, the method prevents damage, whilst ensuring compliance with the luminous flux and/or current setpoints. In a particularly advantageous manner, the rising edges of the signal 2' are synchronized with the rising edges of the original signal 2. Algorithms for the detection of rising edges are known per se from the prior art, and can be implemented by programming a microcontroller element in an appropriate manner. A microcontroller element of this type can execute the functions 126 and 127 described above.

Figure 5:
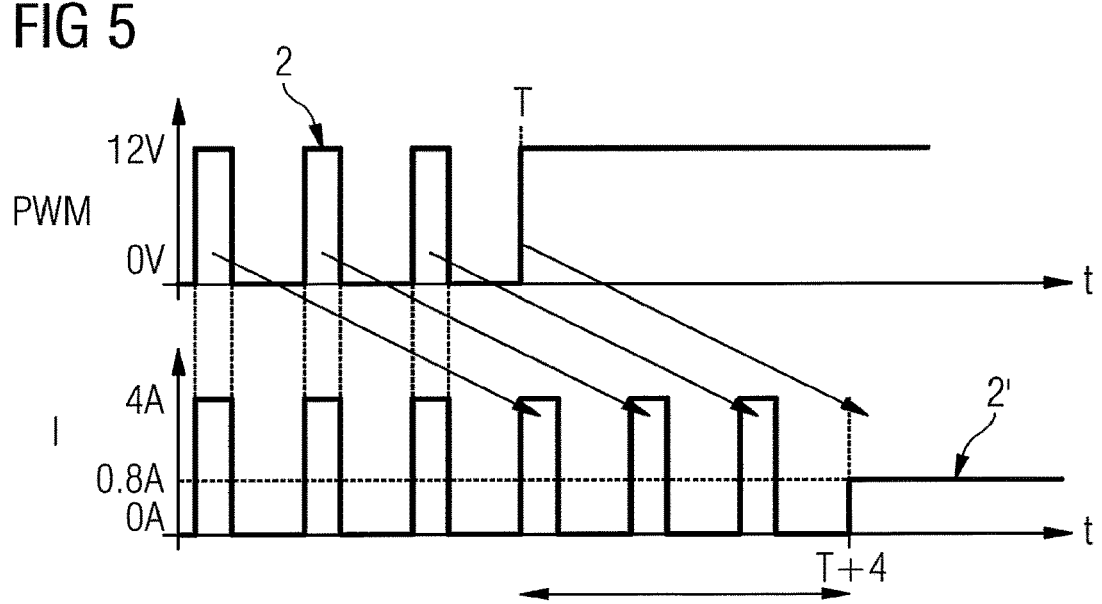
FIG. 5 shows the characteristic of a control signal and of the electric current intensity delivered to a light source of the LED type, in an architecture employing a method and a control module according to a preferred form of embodiment of the invention.

The configuration of the processing means 126 of the control unit 120 of the module 100 specifically permits the accommodation of different scenarios. One of the possible scenarios is illustrated by the example shown in FIG. 5. The PWM control signal 2 is short-circuited at time T. This situation is detected by the control module, which adjusts the average intensity of the current supply to the LEDs at time T+4 in order to fulfil a current setpoint of 0.8 A. Conversely to the example from the prior art shown in FIG. 3, damage to the LEDs 10 is thus prevented. The interval of four periods for the application of the modified control signal 2' is purely exemplary, and is non-limiting. Depending upon the computing performance of the data processing means 126 of the control unit 120, this interval can be reduced, and the application of the control signal 2' can be envisaged for execution in real time. It should be noted that the frequencies of the signal 2 and of the signal 2' (which determines the characteristic of the current I) are identical, and that the rising edges of the two signals are temporally aligned.

Another possible scenario is illustrated by the example shown in FIG. 6. The PWM control signal 2 undergoes a change in duty cycle at time T. This situation is detected by the control module, which adjusts the control signal such that the peak current is reduced with reference to the new duty cycle. The supply current to the LEDs at time T+4 thus fulfils the current setpoint of 0.8 A. It should be noted that the frequencies of the signal 2 and of the signal 2' (which determines the characteristic of the current I) are advantageously identical, and that the rising edges of the two signals are temporally aligned.

Another potential scenario is illustrated by the example shown in FIG. 7. The PWM control signal 2 has a constant frequency, but its duty cycle changes. This situation is detected by the control module, which adjusts the control signal such that the peak current is reduced with reference to the respective duty cycles. The supply current to the LEDs thus fulfils the current setpoint of 0.8 A, which would not otherwise be the case. It should be noted that the frequencies of the signal 2 and of the signal 2' (which determines the characteristic of the current I) are advantageously identical, and that the rising edges of the two signals are temporally aligned.

FIG. 8 illustrates a particularly useful application of the control module 100 described above, wherein the application of the latter is not limited to the scenario illustrated. A lighting system 1000 comprises a control module 100 which is configured to receive a control signal of the PWM type generated by a signal generation unit 200. Transmission of the signal 2 from the unit 200 to the control means 100 proceeds internally to the motor vehicle which is equipped with the lighting system, and is generally executed via a wired connection. The control module 100 is designed to control the intensity of the electric current I delivered to the light sources 10, such that the current I is pulsed at a frequency which is equal to the frequency of the PWM signal 2, whilst observing the luminous flux and/or current setpoints with respect to the light sources. In a synchronous manner, the unit 200 also transmits the signal 2 to a screen 310 which is arranged, for example, in a pair of spectacles 300. Transmission is preferably executed by wireless means, as the pair of spectacles is designed to be worn by the driver of the motor vehicle. To this end, the screen 310 incorporates data reception means. The screen 310 also incorporates optical obturation means, which are controlled by the PWM signal 2 thus received.

At the frequency of the PWM control signal 2, the spectacles switch from a transparent state to an opaque state, or to a state of reduced transparency. As the frequency of obturation is synchronized with the pulsation frequency of the luminous flux emitted by the light sources 10 of the vehicle headlight, the spectacles have no effect upon the perception of the flux emitted by the headlight. The driver perceives the road ahead to be perfectly illuminated by the pulsed headlight. However, luminous fluxes emitted by road traffic approaching in the opposite direction are not synchronized with the frequency of obturation of the spectacles worn by the driver, with a probability close to 1. The shutters of the spectacles are therefore opaque to at least a proportion of the luminous fluxes directed towards the eye of the driver. Spectacles having pulsed shutters thus reduce the perception of luminous intensity from the headlights of other motor vehicles, thereby reducing the risk of dazzling the driver, and improving safety in general. By the use of the present invention, this safety is guaranteed, whilst improving the durability of light sources 10, even if the control signal 2 incorporates spurious events.

The invention claimed is:

1. Control method for at least one light source on a motor vehicle, wherein the method comprises the following steps:
    a) the provision of a setpoint for the luminous flux to be emitted by the light source(s), in a control unit of a control module for said light source(s);
    b) reception, in the control unit, of a first control signal which is intended to control a device for the control of the electric power supply to the light sources;
    c) verification, in the control unit, of the capability of the first control signal to control the control device, such that the luminous flux setpoint is observed;
    d) if the control signal does not show this capability, generation, in the control unit, of a second control signal which is intended to control the device for the control of the electric power supply, in place of said first signal.

2. Method according to claim 1, wherein the first control signal is periodic, with a first frequency and/or the second control signal is periodic, with a second frequency.

3. Method according to claim 2, wherein it comprises the following step:
    e) if the first control signal shows the desired capability, said first signal is employed to control the device for the control of the electric power supply.

4. Method according to claim 2, wherein the rising edges of the second control signal are synchronized in time with the rising edges of the first control signal.

5. Method according to claim 2, wherein, in step c), a constant current setpoint is established by the control unit, by determining the average electric current intensity required to achieve the luminous flux setpoint; the first control signal is appropriate for the achievement of the setpoint, if its duty cycle and the peak current which would be generated by the control device upon the execution of control by means of said first signal will permit the delivery of an average current intensity which is equal to said current setpoint.

6. Method according to claim 2, wherein the second control signal shows a duty cycle which is different from that of the first control signal.

7. Method according to claim 2, wherein the control device controlled by the second control signal generates a peak current which differs from the peak current which would be generated in response to control by the first control signal.

8. Method according to claim 2, wherein steps a) and d) are temporally offset by at least one period of the two signals.

9. Method according to claim 1, wherein it comprises the following step:
    e) if the first control signal shows the desired capability, said first signal is employed to control the device for the control of the electric power supply.

10. Method according to claim 1, wherein the rising edges of the second control signal are synchronized in time with the rising edges of the first control signal.

11. Method according to claim 1, wherein, in step c), a constant current setpoint is established by the control unit, by determining the average electric current intensity required to achieve the luminous flux setpoint; the first control signal is appropriate for the achievement of the setpoint, if its duty cycle and the peak current which would be generated by the control device upon the execution of control by means of said first signal will permit the delivery of an average current intensity which is equal to said current setpoint.

12. Method according to claim 1, wherein the second control signal shows a duty cycle which is different from that of the first control signal.

13. Method according to claim 1, wherein the control device controlled by the second control signal generates a peak current which differs from the peak current which would be generated in response to control by the first control signal.

14. Method according to claim 1, wherein steps a) and d) are temporally offset by at least one period of the two signals.

15. Method according to claim 2, wherein the first frequency is a predetermined frequency.

16. Method according to claim 2, wherein the first frequency is determined by the control unit.

17. Control module of at least one light source on a motor vehicle, comprising a device for the control of the electric power supply to the light sources, and a control unit, wherein the control unit comprises:
   means for the reception of a first control signal,
   a memory component for the storage of a setpoint for the luminous flux to be emitted by the light source(s), or of a current setpoint;
   means for the processing of data, which are configured to verify the capability of the first control signal for the control of the control device, such that the luminous flux setpoint is observed;
   generation means which are configured to generate, if the first control signal does not show this capability, a second control signal, wherein said second signal is intended to control the device for the control of the electric power supply, in place of said first signal.

18. Module according to claim 17, wherein the data processing means of the control unit are configured for the deployment of the control method.

19. Module according to claim 17, wherein the data processing means comprise a microcontroller element.

20. Lighting system for a motor vehicle, wherein it comprises
   at least one light source;
   a screen incorporating means for the reception of a control signal, and optical obturation means which are controlled by a control signal thus received;
   a device for the generation of a first control signal, and
   a control module according to claim 17;
   wherein the generation device is configured to transmit the first control signal in a synchronized manner to the screen via a first data transmission channel, and to the control module via a second data transmission channel.

\* \* \* \* \*